(12) United States Patent
Shinotsuka et al.

(10) Patent No.: US 7,932,947 B2
(45) Date of Patent: Apr. 26, 2011

(54) OUTPUT-COMPENSATING DEVICE AND METHOD OF AN IMAGE SENSOR

(75) Inventors: Sukeyuki Shinotsuka, Saitama (JP); Atsushi Nakajima, Saitama (JP); Hironari Wanatabe, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 2299 days.

(21) Appl. No.: 10/693,204

(22) Filed: Oct. 24, 2003

(65) Prior Publication Data

US 2004/0135913 A1   Jul. 15, 2004

Related U.S. Application Data

(63) Continuation of application No. PCT/JP02/03089, filed on Mar. 28, 2002.

(30) Foreign Application Priority Data

Apr. 27, 2001 (JP) ................ 2001-170263
Sep. 20, 2001 (JP) ................ 2001-330010
Nov. 13, 2001 (JP) ................ 2001-385276
Feb. 14, 2002 (JP) ................ 2002-079681

(51) Int. Cl.
*H04N 5/335* (2011.01)
*H04N 3/14* (2006.01)
(52) U.S. Cl. ................... 348/308; 348/296
(58) Field of Classification Search ........... 348/241, 348/243, 248, 255, 257, 294, 296, 297, 300, 348/302, 308, 312
See application file for complete search history.

(56) References Cited

U.S. PATENT DOCUMENTS 5,861,621 A   1/1999   Takebe et al.
6,140,630 A * 10/2000  Rhodes ............... 250/208.1
6,191,408 B1  2/2001   Shinotsuka et al.
6,618,083 B1 * 9/2003   Chen et al. .......... 348/243
(Continued)

FOREIGN PATENT DOCUMENTS

JP   10090058 A   4/1998
(Continued)

OTHER PUBLICATIONS

International Search Report, issued May 14, 2002 (published Nov. 14, 2002) during the prosecution of International Application No. PCT/JP02/03089.
(Continued)

*Primary Examiner* — Nelson D. Hernández Hernández
(74) *Attorney, Agent, or Firm* — Fulbright & Jaworski L.L.P.

(57) ABSTRACT

An output compensating device of an image sensor using a number of light-sensor circuits, each of which represents a unit pixel and works by producing in a photoelectric converting element a sensor current proportional to a quantity of light falling thereon, converting the current into a voltage signal by using sub-threshold region characteristic of a transistor having a logarithmic output characteristic in a weak inverse state, which enables the image sensor to compensate for variations in each pixel output by using a sensor signal obtainable when changing a gate voltage and drain voltage of the transistor with shut-off light falling on the photoelectric converting element to a value lower than normal voltages of the transistor for taking video. This enables the image sensor to easily compensate for variations in output characteristics of respective light sensor circuits in a pseudo output state created therein with no actual light falling thereon.

2 Claims, 15 Drawing Sheets

U.S. PATENT DOCUMENTS

| | | |
|---|---|---|
| 6,909,462 B1 * | 6/2005 | Shinotsuka et al. .......... 348/308 |
| 7,164,443 B1 | 1/2007 | Hagihara |
| 2002/0051257 A1 | 5/2002 | Okui et al. |
| 2002/0054389 A1 | 5/2002 | Takada et al. |

FOREIGN PATENT DOCUMENTS

| | | |
|---|---|---|
| JP | 11264761 A * | 9/1999 |
| JP | 11298799 A | 10/1999 |
| JP | 2000-075035 | 3/2000 |
| JP | 2000101928 A | 4/2000 |
| JP | 2000175108 A | 6/2000 |
| JP | 2000264761 A | 9/2000 |
| JP | 2000-329616 | 11/2000 |
| JP | 2001036822 A | 2/2001 |
| JP | 2001094878 A | 4/2001 |
| JP | 2001218112 A | 8/2001 |
| JP | 2002044370 A | 2/2002 |
| JP | 2002077733 A | 3/2002 |

OTHER PUBLICATIONS

Japanese Office Action issued on Jun. 19, 2006.

* cited by examiner

OUTPUT-COMPENSATING DEVICE AND METHOD OF AN IMAGE SENSOR

BACKGROUND OF THE INVENTION

The present invention relates to an output compensating device of an image sensor and, more specifically, to an output compensating device for compensating for variations in pixel outputs of a MOS type image sensor.

Japanese Laid-Open Patent Publication No. 2000-329616 discloses a conventional MOS transistor type image sensor using a number of light sensor circuits each representing a unit pixel, which circuit comprises, as shown in FIG. 1, a photodiode PD operating as a photoelectric converting element for producing a sensor current proportional to the quantity of incident light Ls falling thereon, a transistor Q1 having a logarithmic output characteristic in a weak inverse state for converting the sensor current produced in the photodiode into a voltage signal Vpd by using its sub-threshold region characteristic, a transistor Q2 for amplifying the voltage signal Vpd and a transistor Q3 for outputting a sensor signal in accordance with a timing pulse of a readout signal Vs and which circuit is characterized by its wide dynamic range obtained by giving the output a logarithmic characteristic, thereby achieving the high sensitivity of detecting a light signal. In addition, the light sensor circuit is provided with a means for changing a drain voltage VD of the transistor Q1 to a value lower than a normal value for a specified period to remove a charge accumulated in a parasitic capacitor C of the photodiode PD to initialize the circuit. The light sensor circuit can thus obtain a voltage signal Vpd corresponding to the quantity of incident light Ls even if the sensor current absurdly changed, thereby eliminating the possibility of occurrence of an afterglow of the pixel even at a small quantity of incident light.

As shown in FIG. 3, the above-described light sensor circuit may output a signal with a logarithmic characteristic at a normal quantity of sensor current corresponding to a normal quantity of incident light to a photodiode but it may not maintain the logarithmic output characteristic and have a substantially linear output characteristic at a decreased sensor current due to a delay of charging the parasite capacitor of the photodiode. In FIG. 3, WA represents a region of responding with a non-logarithmic characteristic output and WB represents a region of responding with a logarithmic characteristic output.

However, the conventional image sensor using the above-described light sensor circuits forming a matrix of pixels cannot be free from structure-derived variations in output characteristics of pixel signals as shown in FIG. 4, which variations shall be compensated respectively. In FIG. 4, Io denotes a dark sensor current corresponding to a dark current flowing in each photodiode PD with no light falling thereon. Therefore, the conventional image sensor compensates for variations of the output characteristics of the pixel circuits in the following ways. First, the image sensor shall conduct offset compensation of all pixel circuits so that outputs from all pixel circuits at the dark current Io (with no incident light to the photodiodes) are equal to each other. Next, it shall conduct gain compensation for variations of the output characteristics of the pixel circuits so that output characteristics of all pixel circuits in a bright state with incident light to the photodiodes have the same inclination. Alternatively, the variations of output characteristics of all pixel circuits may be cancelled by reversing the order of conducting the above two kinds of compensating operations.

However, it is difficult to perform in practice the accurate offset and gain compensation for variations in output characteristics of respective light sensor circuits by switching off and on illumination of the image sensor to bring the sensor circuits to have the same output level at the same dark current and the same bright current because a light source itself may have variations in luminance and cannot evenly illuminate each of the pixels, frequently being turned ON and OFF.

Furthermore, conducting the output compensation of a number of image sensors at the same time requires the use of a number of light sources. This means the need for increasing the size of the production installation.

In addition, the image sensor cannot be free from having variations in output characteristics of pixel circuits, which may be caused from uneven aging of the light sensor circuits composing the image sensor. In other words, the image sensor must be subject to periodical offset and gain compensation for possible variations in the output characteristics of its light sensor circuits to maintain the same necessary levels of output characteristics of respective pixels at dark and bright currents by switching on and off the illumination.

Furthermore, the image sensor using a matrix of the light sensor circuits each representing a unit pixel suffers variations in output characteristics of light sensor signals Vo, which may result from structure-derived variations and temperature characteristic variations of respective light sensor circuits. This means that the image sensor cannot produce accurate outputs in a dark state and a bright state when taking video without compensation for the above-described variations in the output characteristics of the image sensor.

In consideration of the above, Japanese Patent Applications No. 2000-404931, 2000-404933, 2000-75035 by the assignee of this application disclose an image sensor which has been compensated for output characteristics of its light sensor circuits in the final inspection process before shipment in such a way that actual output variation values of each light sensor circuit are measured, an offset compensation value and a gain compensation multiplier corresponding to the measured values are read out from a compensation table stored in a memory and then the sensor circuit is offset- and gain-compensated for values determined by calculation, thus achieving the accurate compensation for variations in output characteristics of respective light sensor (pixel) circuits of the image sensor.

However, the image sensor comprising a number of light sensor circuits each representing a unit pixel, in which a sensor current proportional to incident light is produced in a photoelectric converting element and converted into a voltage signal by using a MOS type transistor having logarithmic output characteristic in a weak inverse state, still involves such a problem that the image sensor cannot be free from the occurrence of variations of output characteristics of respective sensor (pixel) circuits during the use of the image sensor after initial compensation. This causes degradation of the image taken by the image sensor.

SUMMARY OF THE INVENTION

An object of the present invention is to provide an output compensating device of an image sensor using a number of light sensor circuits each representing a unit pixel and working by producing in a photoelectric converting element a sensor current proportional to incident light falling thereon, converting it into a voltage signal by using a sub-threshold region characteristic of a transistor having a logarithmic output characteristic in a weak inverse state and outputting a sensor signal corresponding to the converted voltage signal, which is capable of compensating for variations in output characteristics of respective light sensor circuits (pixels) by creating a pseudo bright output state with no incident light. To realize the above, there is provided means of enabling the image sensor to compensate for variations in output characteristics of respective pixel circuits by using sensor signals output from the light sensor circuits with no light falling on the respective photoelectric converting elements by changing the gate and drain voltages of the respective transistors to values lower than normal gate and drain voltage values when taking video by the image sensor.

Another object of the present invention is to provide an output compensating device of an image sensor using a number of light sensor circuits each representing a unit pixel and working by producing in a photoelectric converting element a sensor current proportional to incident light falling thereon, converting it into a voltage signal by using a sub-threshold region characteristic of a transistor having a logarithmic output characteristic in a weak inverse state and outputting a sensor signal corresponding to the converted voltage signal, which is capable of compensating for variations in output characteristics of respective light sensor circuits by creating a pseudo bright output state and a dark output state respectively with no illumination. For this purpose, there is provided means of enabling the image sensor to compensate for variations in output characteristics of the pixels by using two kinds of output sensor (pixel) signals of the light sensor circuits, the first signal is obtainable by setting the gate and drain voltages of the transistor of each sensor circuit with shutting off incident light to the photoelectric converting element to normal values for taking video and the second signal is obtainable by changing the gate and drain voltages of the same transistor to values lower than the respective normal values.

Another object of the present invention is to provide an output compensating device of an image sensor using a number of light sensor circuits each representing a unit pixel and working by producing in a photoelectric converting element a sensor current proportional to incident light falling thereon, converting it into a voltage signal by using a sub-threshold region characteristic of a MOS type transistor having logarithmic output characteristic in a weak inverse state and outputting a sensor signal corresponding to the converted voltage signal, which provides means of enabling the image sensor to compensate for variations in output characteristics of respective light sensor circuits by using sensor signals obtainable when conducting respective transistors by changing their gate voltage to a value higher than a normal value for taking video. This means that the image sensor can compensate for variations in output characteristics of the pixel circuits by creating pseudo dark states of the circuits without putting on and off illumination.

Specifically, to achieve the above purpose, the first practical means enables the image sensor to carry-out offset compensation of outputs of the light sensor circuits by using sensor signals obtained by changing the transistor gate voltage to a value higher than a normal value for taking video, which in this case correspond to signals output in a dark state (with no incident light) when taking video. This can achieve a condition that pixel signals may align at the same level in the same dark state. The second practical means enables the image sensor to perform compensation for variations in output characteristics of each pixel circuit by using a sensor signal corresponding to a dark state pixel output, which signal is obtained when the transistor is conducted with its gate voltage changed to a value higher than a normal value and its drain voltage being equal to a normal value for taking video, and a sensor signal corresponding to a bright state pixel output, which signal is obtained by changing the drain voltage of the transistor to a value lower than the normal. This can align the pixel signals output in the bright output state at the same level.

A further object of the present invention is to provide an output compensating device of the same image sensor, which is capable of more precisely compensating for variations in the output of each of the light sensor (pixel) circuits in such a manner that a drain voltage of the transistor of the light sensor circuit is first set to a value at which a sensor signal output from the sensor circuit when conducting the transistor with its gate voltage changed to a value higher than a normal value for taking video can correspond to a sensor signal output in an actual dark output state, which is obtainable at a normal gate voltage of the transistor, and the compensation for variation in output of each pixel circuit is then conducted by using the output signal obtained by changing the drain voltage of the transistor to a value higher than the normal value for taking video.

A still further object of the present invention is to provide an output compensating device of the same image sensor, which is capable of more precisely compensating variations in dark- and bright-state output levels of the light sensor (pixel) circuits in such a manner that a drain voltage of the transistor of the sensor circuit is preset to a value at which an output signal from the sensor circuit when the transistor conducted with its gate voltage changed to a value higher than a normal value for taking video can correspond to a dark state sensor signal obtainable at a normal gate voltage of the transistor when taking video by the image sensor, and an output signal output from the sensor circuit by changing the drain voltage of the transistor to a value lower than the preset value, which signal can therefore correspond to a bright state sensor signal obtainable when taking video by the image sensor, and each of the pixel circuit is then compensated for possible variations in its outputs obtainable by the above method.

Another object of the present invention is to provide an output compensating device of an image sensor using a number of light sensor circuits each representing a unit pixel and working by producing in a photoelectric converting element a sensor current proportional to incident light falling thereon, converting the sensor current into a voltage signal by a MOS type transistor having logarithmic output characteristic in a weak inverse state and outputting a sensor signal corresponding to the converted voltage signal, which is capable of compensating for variations in output levels of respective light sensor (pixel) circuits, which variations may occur during the actual operation of the image sensor, in such a manner that variations in sensor signals currently output from respective pixel circuits are calculated in comparison with a reference bright-state output level (with an incident light having a high luminance at which a saturated pixel output is obtained) and the variations are then canceled by offset compensation.

Specifically, the output compensating device comprises a sample-and-hold circuit for temporarily storing sensor signals read in a time series from respective pixels (light sensor circuits), means for obtaining pseudo bright output signals by decreasing by a threshold value the normal drain voltages of the respective transistors for corresponding pixels and offset compensation means for calculating a difference between each of the obtained pseudo signals and the corresponding sensor signal temporarily stored in the storage means and conducting the offset compensation of the previously set bright-state reference signal for the difference determined as the offset value to obtain the correct output level of each sensor (pixel) signal.

PREFERRED EMBODIMENTS OF THE PRESENT INVENTION

Figure 1:
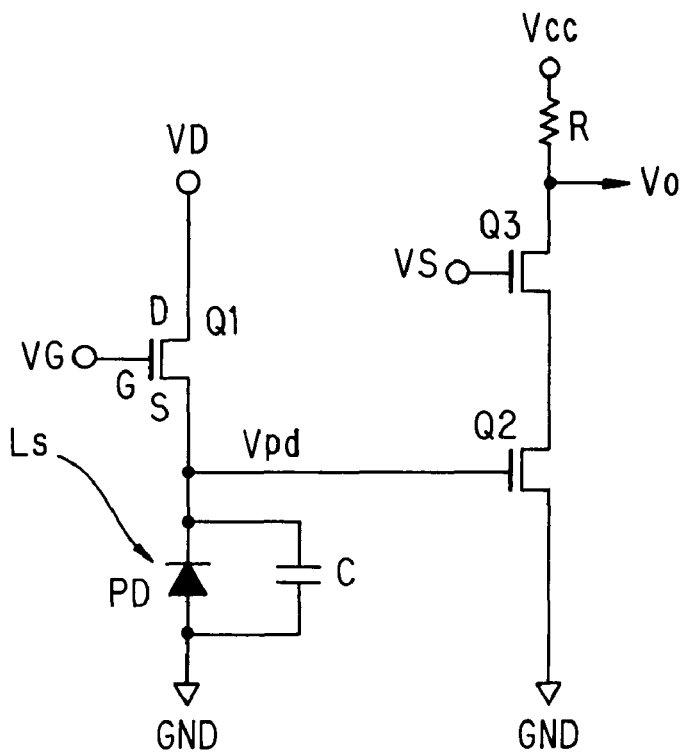
FIG. 1 is an electric circuit diagram of a light sensor circuit, which is used as a unit pixel component of an image sensor according to the present invention.

Referring to FIG. 1, there is shown a light sensor circuit used as a unit pixel in an image sensor whose output is compensated by an output compensating device according to the present invention.

Figure 5:
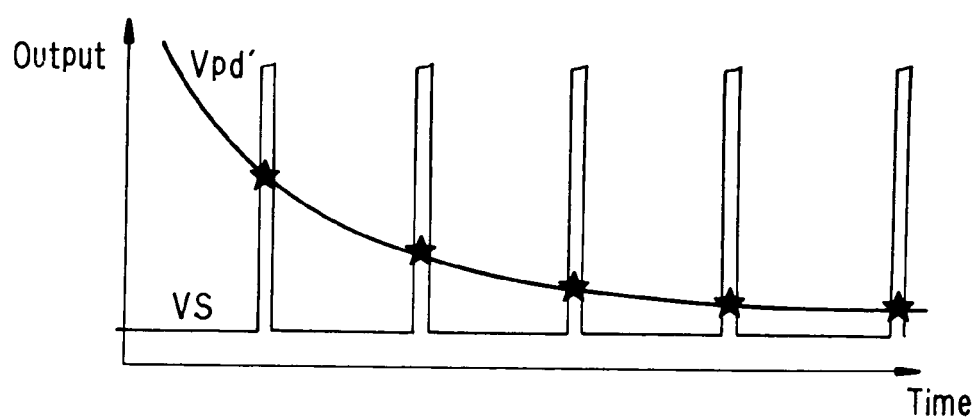
FIG. 5 shows an output characteristic of a sensor signal output at a specified timing with a small quantity of light falling on a light sensor circuit which has not been initialized.

The light sensor circuit comprises a photodiode PD operating as a photoelectric converting element for producing a sensor current proportional to the quantity of incident light Ls falling thereon, a transistor Q1 having a logarithmic output characteristic in a weak inverse state for converting the sensor current produced in the photodiode into a voltage signal Vpd by using its sub-threshold region characteristic, a transistor Q2 for amplifying the voltage signal Vpd and a transistor Q3 for outputting a sensor signal Vo in accordance with a timing pulse of a readout signal Vs. The gate voltage VG of the transistor Q1 is preset to a value lower than that of the drain voltage VD of the same transistor. The light sensor circuit can produce sufficient sensor current in the transistor Q1 while a sufficient quantity of light Ls is falling on the photodiode PD and can therefore detect a light signal at a response speed that is fast enough to prevent the occurrence of an afterimage of the pixel owing to a relatively small value of resistance of the transistor Q1. However, since the transistor Q1 is set to operate with resistance increased by one order when a current therein decreases by one order, decreasing the current flowing in the transistor Q1 with a decrease in the quantity of incident light Ls falling on the photodiode PD causes the transistor Q1 to rapidly increase its resistance. At the same time, a time constant of the circuit containing a parasitic capacitor C of the photodiode PD with the increased resistance is increased to elongate the time necessary for removing electric charge accumulated in the parasitic capacitor C. As a result, an afterimage can be viewed for a longer duration as the quantity of incident light Ls decreases. The saturation time of a voltage signal Vpd corresponding to a sensor current in the photodiode PD with a decreased quantity of incident light falling thereon is also prolonged. Therefore, if a pixel signal Vo is output in accordance with timing pulses of a reading signal Vs as shown in FIG. 5, then an output appears with an afterglow that may be of a higher level at an earlier time. In FIG. 5, Vpd' designates an inverse amplified voltage signal produced by the amplifying transistor Q2. The light sensor circuit is capable of initializing itself before detecting a pixel signal Vo by removing electric charge accumulated in a parasitic capacitor C of the photodiode PD by changing a drain voltage VD of the transistor Q1 to a level lower than normal for a specified period. This enables the light sensor circuit to immediately obtain a voltage signal corresponding to the quantity of incident light Ls at that time even if a sensor current rapidly changed. Thus, the light sensor circuit may not cause an afterglow of the pixel even with a small quantity of incident light Ls.

Figure 2:
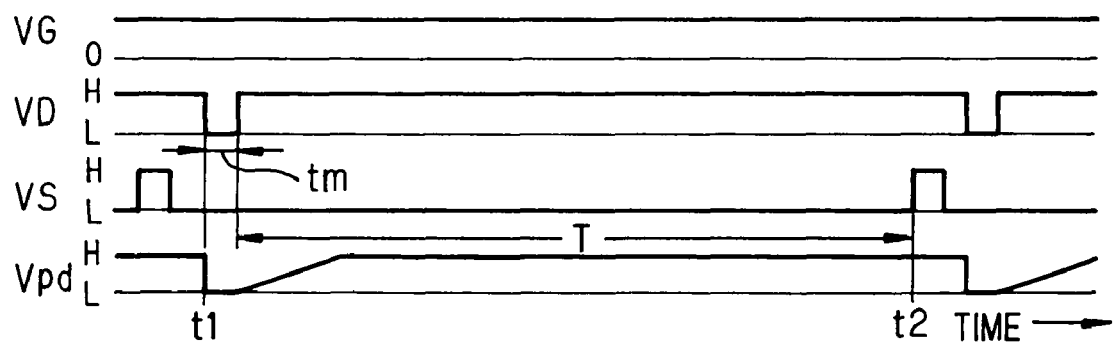
FIG. 2 is a time chart of signals produced at respective portions of the light sensor circuit of FIG. 1.
Figure 3:
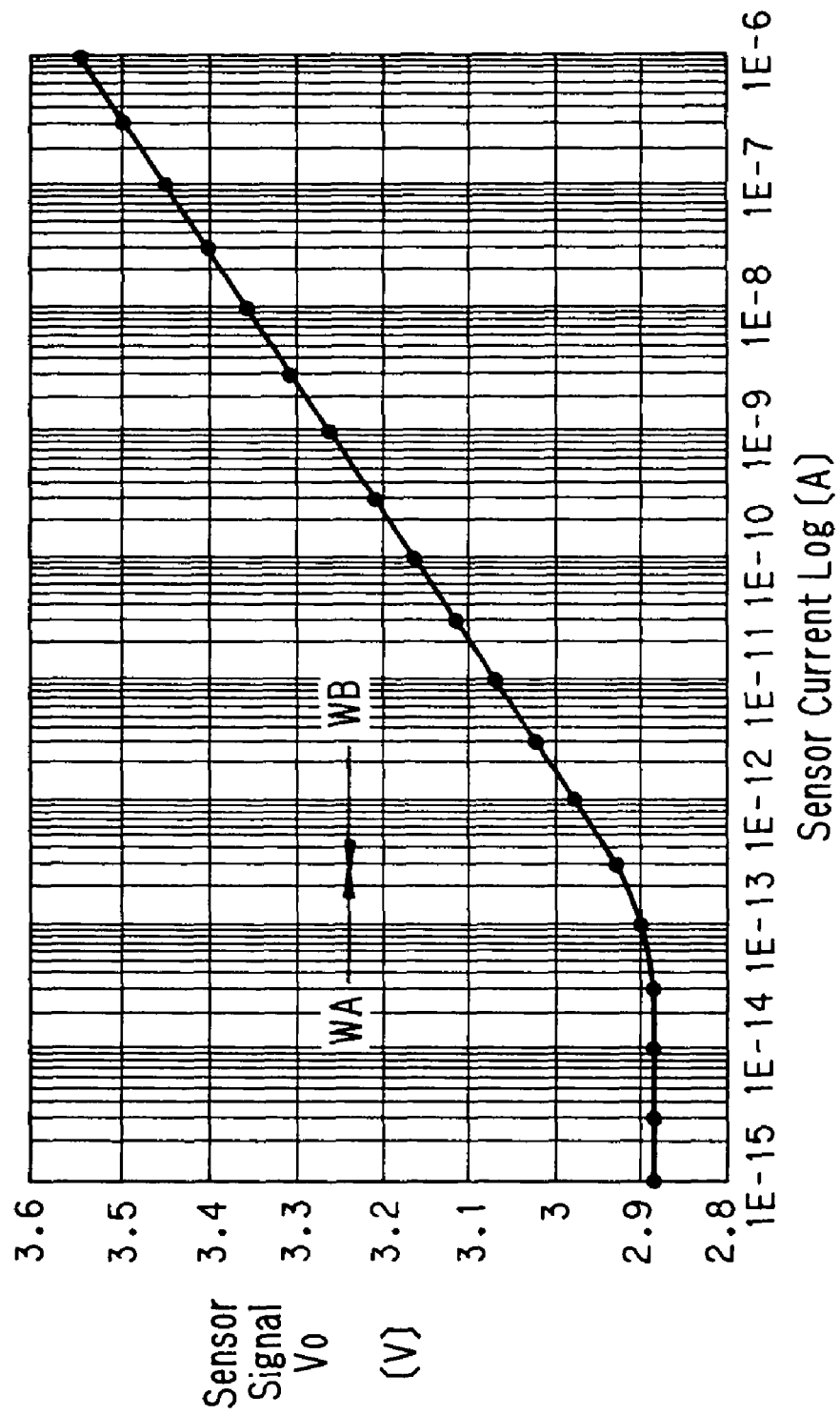
FIG. 3 shows a characteristic of a pixel output signal versus a light sensor current flowing in a photodiode of the light sensor circuit of FIG. 1.
Figure 4:
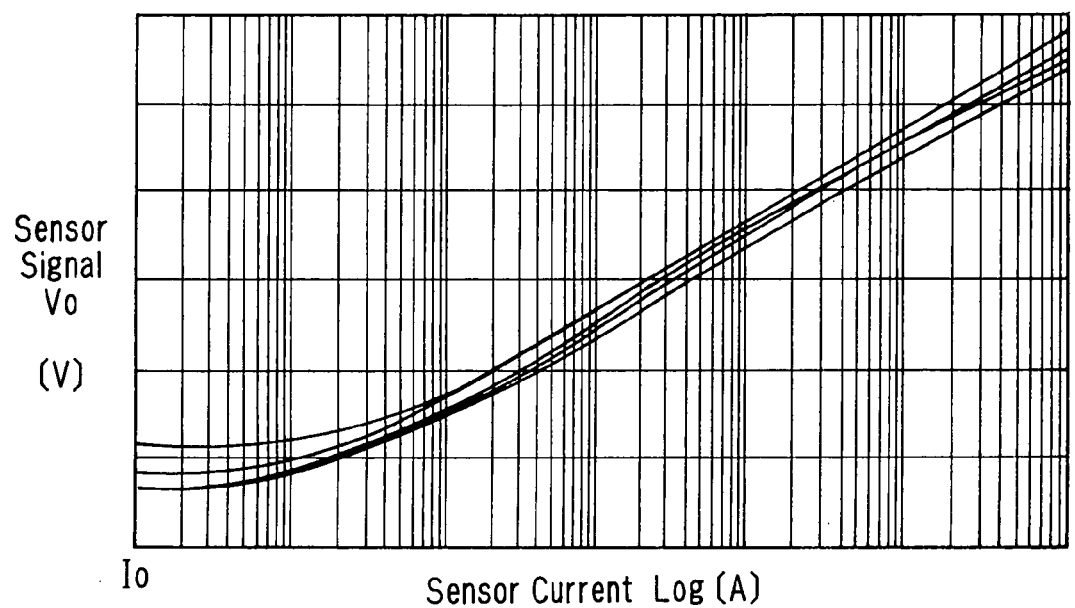
FIG. 4 shows an example of variations in output characteristics of pixel signals of an image sensor using the pixel-representing light sensor circuits of FIG. 1.

FIG. 2 shows a time chart of signals produced at various portions of the light sensor circuit. In FIG. 2, t1 is an initializing timing pulse and t2 is a light-signal detection timing pulse. A specified time tm for which the drain voltage VD of the transistor Q1 is switched from a normal value (high level H) to a lower voltage value (low level L) and kept at the low level L is set for example to about 5 microseconds in case of reading a pixel at a speed of about 100 nanoseconds. In FIG. 2, T designates a period for accumulating a charge in a parasitic capacitor C of the photodiode PD, which period is about 1/30 (or 1/60) seconds for a NTSC signal.

In the light sensor circuit, once the drain voltage VD of the transistor Q1 has been switched over to the low level L for initializing the circuit, the transistor Q1 is brought into the low-resistance state if a potential between the gate voltage VG and the drain voltage VD is greater than a threshold of the transistor Q1. Therefore, the source side potential at that moment becomes equal to the drain voltage VD (the source voltage for n-MOS transistor is equal to the drain voltage), causing the junction capacitor C of the photodiode C to be discharged.

Once the drain voltage VD of the transistor Q1 was changed to the normal value (high level H) with an elapse of the time tm and a light signal was then detected, the source side potential becomes lower than the drain voltage VD. If the difference between the gate voltage VG and the drain voltage VD is larger than the threshold, the MOS type transistor Q1 reaches the low-resistance state and allows the junction capacitor C of the photodiode to be charged again.

The junction capacitor C of the photodiode PD is discharged for initializing the light sensor circuit before detecting a light signal and then charged. In this case, the output voltage Vpd (a terminal voltage of the photodiode PD) with an elapse of a specified time from the initializing timing attains a value corresponding to the quantity of incident light Ls. In other words, the light sensor circuit after initialization can obtain a discharging characteristic with a specified time constant in response to a change in the quantity of incident light Ls.

In that case, if the light sensor circuit is left as it is for a long time, a current supplied from the drain voltage VD through the transistor Q1 becomes equal to a current flowing in the photodiode PD. The same discharging characteristic can be thus always maintained as far as no charge remains. This prevents the occurrence of an afterglow of the pixel.

The light sensor circuit can therefore obtain a pixel signal Vo corresponding to the quantity of incident light Ls with no afterglow of the pixel by detecting a light signal with an elapse of a specified time after initialization of the circuit.

Figure 6:
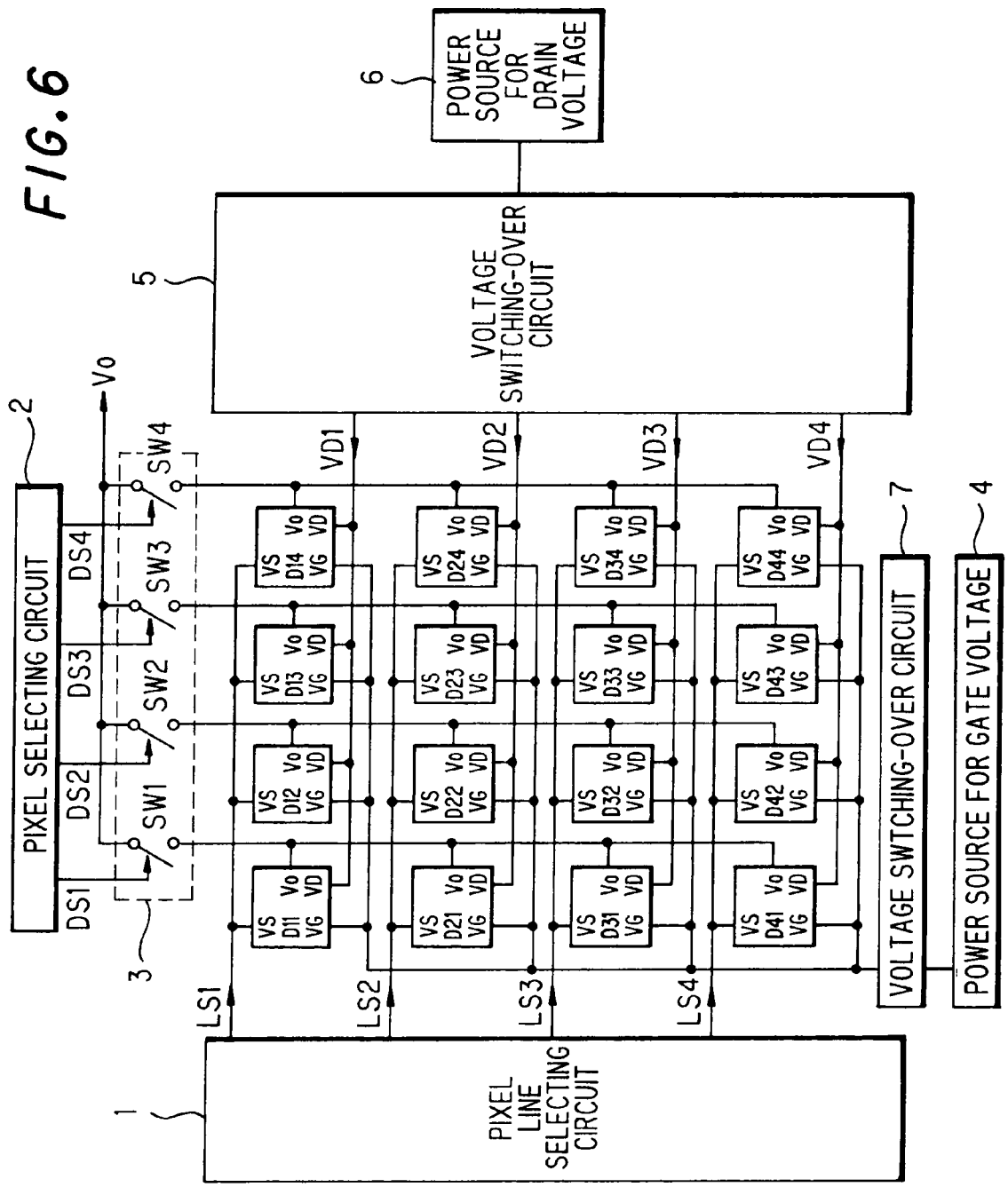
FIG. 6 is a block diagram showing an exemplified construction of an image sensor to which the present invention pertains.

FIG. 6 shows an exemplary construction of an image sensor using a number of the above-described light sensor circuits arranged to form a matrix of pixels, wherein sensor signals from respective pixels are read by scanning in a time series.

The image sensor is composed basically for example of 4×4 pixels (i.e., light sensor circuits) D11~D44 arranged in a matrix of pixel circuits, in which pixel lines are selected one by one with respective selecting signals LS1~LS4 successively output from a pixel line selecting circuit 1 and pixels in each selected pixel line are readout one by one as respective sensor signals in such a manner that selecting signals DS1~DS4 successively output from a pixel selecting circuit 2 turn on corresponding switches SW1~SW4 to read respective pixel signals Vo in a time series. In FIG. 6, numeral 4 designates a power source for gate voltage VG of the transistor Q1 and numeral 6 designates a power source for drain voltage VD of the transistor Q1.

The image sensor is provided with a voltage switching-over circuit 5 by which a drain voltage VD of each transistor Q1 for each pixel is changed from a normal high-level H to an initializing lower level L and reverse by the effect of specified timing pulses when selecting each line of pixels.

Figure 7:
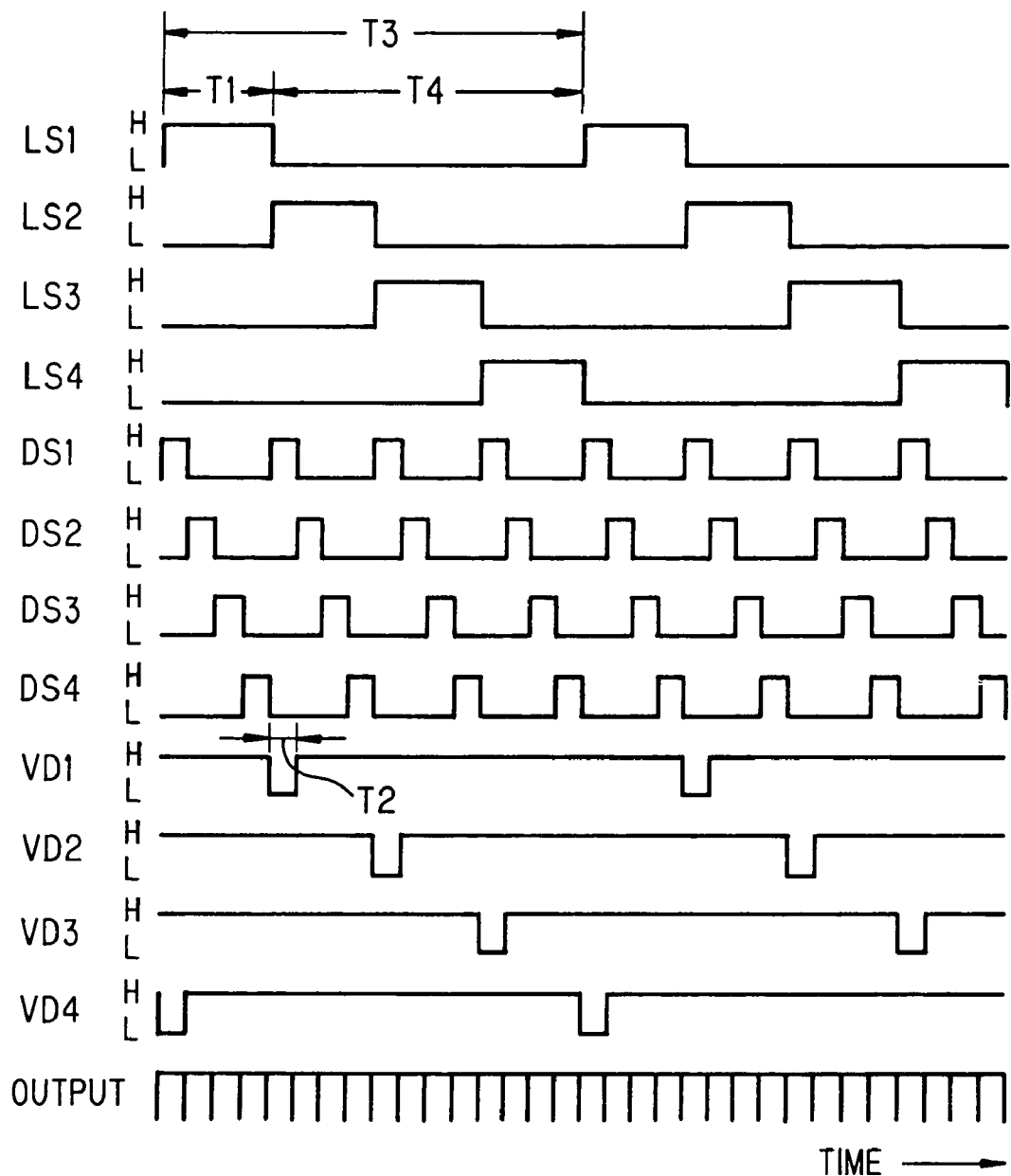
FIG. 7 is a time chart of signals produced at respective portions of the image sensor of FIG. 6.

The operation of the above-described image sensor to which the present invention is applied will be described with reference to FIG. 7 showing a time chart of signals generated at respective portions of the image sensor.

Once the pixel-line selecting signal LS1 reaches the high level H, the first pixel line including pixels D11, D12, D13 and D14 is selected and, during a specified period T1 of the signal LS1 remaining at the high level H, pixel selecting signals DS1~DS4 successively reach the high level H to start the successive reading of pixel signals Vo from the pixels D11, D12, D13 and D14.

As soon as the pixel-line selecting signal LS1 was changed to the low level, a next pixel-line selecting signal LS2 is changed to the high level H to select the second pixel line containing pixels D21, D22, D23 and D24. For a specified period T1 of the signal LS2 remaining at the high level, the pixel selecting signals DS1~DS4 successively reach the high level H to start the successive reading of pixel signals Vo from pixels D21, D22, D23 and D24.

Similarly, with the pixel-line selecting signals LS3 (LS4) changed to the high level H, the third (fourth) pixel line is selected and then, for a specified period T1 for which the signal LS3 (LS4) remains at the high level H, the pixel selecting signals DS1~DS4 successively reach the high level H to start the successive reading of pixel signals Vo from pixels D31, D32, D33 and D34 (D41, D42, D43 and D44).

When the pixel-line selecting signal LS1 was changed to the low level L after the period T1, the drain voltage VD1 for the pixels D11, D12, D13 and D14 in the first selected line is turned to the low level for a specified period T2 to make the pixels initialized and prepared for the next cycle of reading the pixel signals, which cycle will be performed with the elapse of one cycle time T3. When the pixel-line selecting signal LS2 was changed to the low level L after the period T1, the drain voltage VD1 for the pixels D21, D22, D23 and D24 in the second selected line is turned to the low level for the specified period T2 to initialize the pixels for the next sensor-signal reading cycle to be performed with the elapse of one cycle time T3.

Similarly, once the pixel-line selecting signal LS3 (LS4) was changed to the low level L after the period T1, the drain voltage VD3 for the pixels in the third (fourth) selected line is turned to the low level to initialize the pixels for the next sensor-signal reading cycle to be performed with the elapse of one cycle time T3.

Although the drain voltage VDX is turned to the low level L to initialize each pixel circuit with the pixel-line selecting signal LSX (X=1~4) decreased to the low level with elapse of the period T1, the initializing timing may be within the duration T4 for which the pixel line selection is paused with the pixel-line selecting signal LSX being at the Low level L.

The timing of occurrence of signals at respective portions is decided by driving the pixel-line selecting circuit 1, the pixel selecting circuit 2 and the voltage switching-over circuit 5 under the control from a control circuit (not shown).

Initializing each pixel at the timing adapted to scanning for reading each pixel signal may avoid an over or short charge-accumulating duration for a whole system of the image sensor. This image sensor can thus have a wide dynamic range of its logarithmic output characteristic without causing the afterglow of the pixels.

The present invention is directed to an output-compensating means capable of compensating for variations in the output characteristics of the light sensor circuits of the above-described image sensor. To compensate for variations in output levels of sensor signals Vo, which may be derived from the structural variations of the image sensor, the output compensating device carries out compensation for variations in output levels of pixel signals by using sensor signals which can be obtained by cutting incident light Ls to the light sensor circuits and changing a gate voltage VG and a drain voltage VD of the current-to-voltage converting transistor Q1 having a logarithmic output characteristic to respective values lower than the respective normal values for taking video by the image sensor. In this case, each sensor (pixel) output B which was obtained by changing the gate voltage VG and the drain voltage VD of the transistor Q1 from the normal values VGa and VDa to the lower values VGb and VDb respectively can be assumed to correspond to a sensor signal obtainable in a bright state of the image sensor when taking video and then the variation of the sensor signal is canceled by gain compensation.

The provision of the above means enables the image sensor to create a pseudo bright output state of each pixel circuit with no incident light and compensate in that state for variations in output characteristics of respective pixel circuits.

The present invention provides an output compensating device of the above-described image sensor, which is capable of compensating for unevenness of levels of sensor signals Vo at respective pixels, which may be caused by structure-derived variations in output characteristics of respective light sensor circuits, by using a sensor output A obtained with no incident light by setting gate and drain voltages VG and VD of the transistor Q1 to normal values VGa and VDa respectively for taking video and a sensor output B obtained in the same state by changing the gate and drain voltages VG and VD of the transistor Q1 to values VGb and DVb lower than the normal values. In this case, the levels of outputs of the respective pixels in the same dark state are aligned by offset compensation by using the outputs A corresponding to the dark-state sensor outputs when taking video and the levels of outputs of the respective pixels in the same bright state are aligned by gain compensation by using outputs B corresponding to the bright-state sensor outputs when taking video.

The provision of the above means enables the image sensor to create pseudo dark and bright output states with no incident light and compensate in that state for variations in output characteristics of the pixel circuits.

In the above case, output A is obtained when VGa≦VDa while output B is obtained when VGb≦VDb. The gate voltage VG and drain voltage DV of the transistor Q1 are changed over to values selected in a range of 0 to values smaller than the respective normal values by the threshold voltage Vth of the transistor. In the other words, VGb→0~(VGa-Vth) and VDb→0~(VDa-Vth).

In the image sensor shown in FIG. 6, changing-over of the gate voltage of each transistor Q1 from VGa to VGb is conducted by a voltage changing-over circuit 7 for switching over a VG voltage power source 4, and changing-over of the drain voltage of the transistor Q1 from VDa to VDb is conducted by a voltage changing-over circuit 5 for switching over a VD voltage power source 6 under the control from an electronic control unit (ECU, not shown).

According to the present invention, compensation for variations in output characteristics of respective light sensor (pixel) circuits can be achieved with no incident light to the image sensor. This method can accurately compensate for variations in output characteristics of respective pixel circuits since it is completely free from the need of creating evenly bright and dark states of respective pixels by frequently turning on and off the illumination, which is impossible in practice in view of the variations in luminance of light source.

The image sensor can be compensated at any time as the need be (after shipment from the maker's factory) for aging variations in the output characteristics of respective light sensor (pixel) circuits.

According to the present invention, a number of the image sensors can be compensated at the same time on the maker's factory with no need of using a number of light sources. This can reduce the size of manufacturing installation.

The present invention is to provide an output compensating device of the same image sensor, which is capable of compensating for variations in output levels of sensor signals Vo, which may be derived from structural variations of respective light sensor circuits, by using sensor signals obtained when conducting the transistors Q1 of respective sensor circuits by changing the gate voltage VG to a value higher than a normal value for taking video by the image sensor. In this case, all the sensor signals obtained by changing the gate voltage VG of respective transistors Q1 to a value higher than the normal value may correspond to the dark-state sensor outputs which shall be offset compensated for possible variations to attain the same dark-state output level.

The provision of the above compensating means enables the image sensor to create a pseudo dark output state of each light sensor circuit without cutting the incident light thereto and compensate the variations in output characteristics of the respective sensor circuits in the pseudo dark state created in the image sensor.

In a light sensor circuit shown in FIG. 1, once the converting transistor Q1 conducted with its gate voltage VG changed to a value higher than the normal value for taking video, the drain voltage VD of the transistor Q1 is directly applied to the gate of an amplifying transistor Q2 of the next stage, whereby variation of the threshold voltage of the transistor Q1 is canceled. An output of the sensor circuit at that time corresponds to an output of the sensor circuit in the dark output state.

Figure 19:
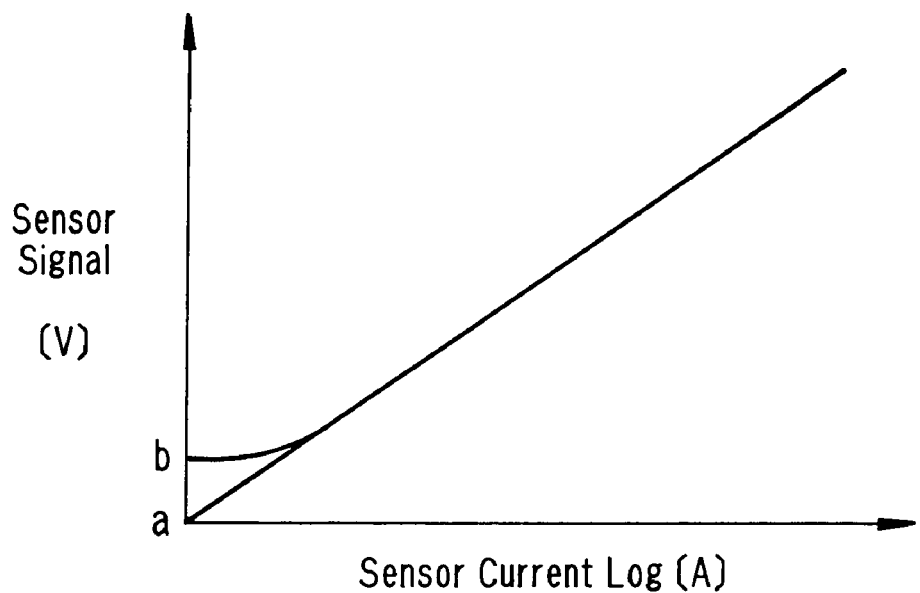
FIG. 19 shows a difference between a sensor output obtained by conducting a transistor of a light sensor circuit for converting the output into a voltage with logarithmic characteristic in an ideal dark state and a sensor output obtained actually in a dark state.

If the output of the light sensor circuit when the transistor Q1 was conducting and its drain voltage VD at that time was applied directly to the gate of the amplifying transistor Q2 of the next stage was supposed to correspond to the output of the sensor circuit in the dark state, there arises the following problem:

Namely, the above condition may be realized if the transistor Q1 and the photodiode PD possess ideal characteristics. But, in practice, the photodiode PD with no light falling thereon has a dark current flowing therein and hence the sensor output with the transistor Q1 in the conducting state is different from an actual dark-state output as shown in FIG. 19 where "a" is an ideal dark-state output and "b" is actual dark-state output.

Figure 20:
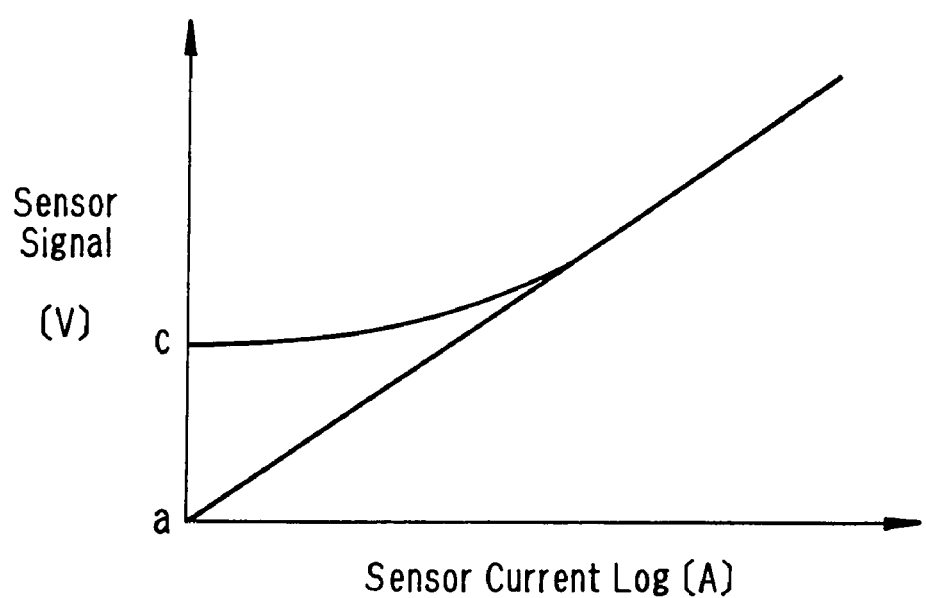
FIG. 20 shows a difference between a sensor output obtained when conducting a transistor of a light sensor circuit for converting the output into a voltage with logarithmic characteristic in an ideal state and a sensor output obtained actually in a dark state after initialization for preventing the occurrence of afterglow of each pixel.

Furthermore, the above difference is further increased as shown in FIG. 20 in the case where the drain voltage VD of the transistor Q1 is set to a value lower than the normal value for a specified period in order to initialize the light sensor circuit before reading a sensor signal Vo for preventing the occurrence of an afterglow of the pixel. In FIG. 20, "c" shows a dark-state output during the period of initializing the light sensor circuit for preventing the occurrence of an afterglow of the pixel.

In view of the above, according to the present invention, the gate voltage VG of the current-to-voltage converting transistor Q1 can be selectively adjusted so that a sensor output corresponding to a correct dark-state output may be obtained by causing the transistor Q1 to conduct with its gate voltage changed to a value higher than the normal value for taking video by the image sensor.

Specifically, an actual output value of each light sensor circuit in the dark state in the stage before compensation is measured and stored in the memory and the drain voltage VD of the transistor Q1 is previously adjusted to a value at which the sensor output obtained when the transistor Q1 conducts with its gate voltage VG changed to a value higher than the normal value for taking video may be equal to the actual value stored in the memory. In case of repeating the compensation, it may be also possible to use a mean of actual output values measured and stored each time before the compensation and previously adjust the drain voltage VD of the transistor Q1 to a value at which the sensor output obtained when the transistor Q1 conducted with its gate voltage VG changed to a value higher than the normal value for taking video may be equal to the mean value. The offset compensation for variations in outputs of respective light sensor (pixel) circuits is then conducted by using the outputs obtained by changing gate voltages VG of the transistors Q1 to a value higher than the normal value for taking video by the image sensor. The offset compensation values for respective pixels are determined based on the corresponding sensor outputs obtained in the above pre-adjusted state of the image sensor. This allows the image sensor to correct the outputs of the light sensor circuits with the same initial values in the dark state. The adjustment of the drain voltage VD of the transistor Q1 simultaneously sets a working point of the amplifying transistor Q2 of the next stage.

In the image sensor constructed as shown in FIG. 6, the means of changing the gate voltage VG of the transistor Q1 to a value higher than the normal value for taking video and the means of storing in a memory an actual output of each light sensor circuit in a dark state and means of previously adjusting a drain voltage VD of the transistor Q1 to a value at which an output of the light sensor circuit when conducting the transistor Q1 with its gate voltage VG changed to a value higher than the normal value for taking video may be equal to the actual value stored in the memory are realized by a voltage changing-over circuit 7 for selecting a voltage of a gate-voltage (GV) power source 4 and a voltage changing-over circuit 5 for selecting a voltage of a drain-voltage (VD) power source 6, which are operated under the control from an electronic control unit ECU (not shown).

The present invention provides an output compensating device of the same image sensor, which is capable of compensating for variations in output levels of sensor signals Vo, which may be derived from structural variations of respective light sensor circuits, by using sensor signals obtained when conducting the transistors Q1 of respective sensor circuits by changing the gate voltage VG of the transistors to a value higher than a normal value for taking video by the image sensor. In this case, a sensor signal output from each light sensor circuit when transistor Q1 is conducting with its gate voltage VG changed to a value higher than the normal value for taking video can be assumed to correspond to an output of the light sensor circuit in the dark-state when taking video by the image sensor and a sensor signal output from each light sensor circuit when transistor Q1 is conducting with its gate voltage VG changed to a value lower than the normal value for taking video can be assumed to correspond to an output of the light sensor circuit in the bright-state when taking video by the image sensor. All output signals from all light sensor circuits of the image sensor are corrected by compensation to align at the same dark-state output level and the same bright-state output level respectively.

The provision of the above-described compensating means enables the image sensor to create therein pseudo dark and bright output states of each light sensor circuit as though being illuminated without shutting off light actually falling on the image sensor and compensate for the variations in output characteristics of the respective sensor circuits in the pseudo dark and bright states of the image sensor.

Specifically, an actual output value of each light sensor circuit in the actual dark state in the stage before compensation is measured and stored in the memory and the drain voltage VD of the transistor Q1 is previously adjusted to a value at which the sensor output obtained when the transistor Q1 was conducting with its gate voltage VG changed to a value higher than the normal value for taking video by the image sensor may be equal to the actual dark-state output value stored in the memory. In case of repeating the compensation thereafter, it may be also possible to use a mean of actual output values measured and stored each time before the compensation and previously adjust the drain voltage VD of the transistor Q1 to a value at which the sensor output obtained when the transistor Q1 conducted with its gate voltage VG changed to a value higher than the normal value for taking video may be equal to the mean value. The offset compensation for variations in outputs of respective light sensor (pixel) circuits is then carried out by using the outputs obtained when transistor Q1 with the preset drain voltage VD conducted with its gate voltages VG changed to a value higher than the normal value for taking video.

The present invention provides an output compensating device of the same image sensor, which is capable of compensating for variations in output levels of sensor signals Vo in a bright state with light falling on the image sensor, which variations may be derived from structural variations of respective light sensor circuits, by using sensor signals obtained when conducting the transistors Q1 of respective sensor circuits by changing the drain voltage VD to a value lower than a normal value (or the preset value) for taking video by the image sensor. In this case, a sensor signal output from each light sensor circuit when transistor Q1 is conducting with its drain voltage VD changed to a value lower than the normal value for taking video can be assumed to correspond to an output of the light sensor circuit in the actual bright state when taking video by the image sensor.

The provision of the above-described compensating means allows the image sensor to create pseudo bright output states of each light sensor circuit irrespective of how it is illuminated and compensate in that state for the variations in output characteristics of the respective sensor circuits.

In the image sensor constructed as shown in FIG. 6, the means of changing the gate voltage VG of the transistor Q1 to a value higher than the normal value for taking video and the means of changing the drain voltage VD of the transistor Q1 to a value lower than the normal value for taking video are realized by the voltage changing-over circuits 5 and 7 which are operated under the control from an electronic control unit ECU (not shown).

Figure 8:
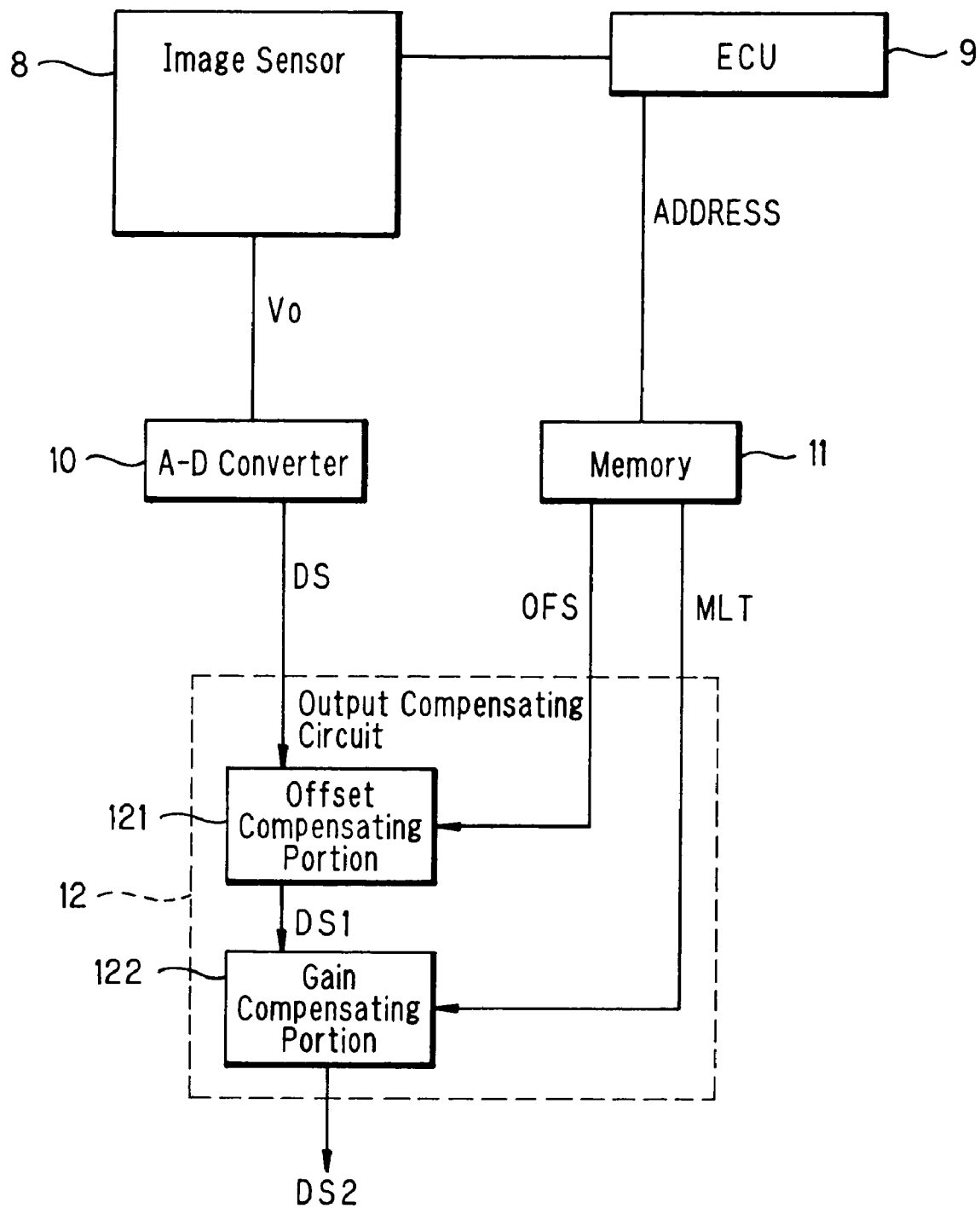
FIG. 8 is a block construction diagram of an output compensating device of an image sensor according to an embodiment of the present invention.

FIG. 8 illustrates a construction of a system for compensating for variations in output characteristics of pixel signals of an image sensor.

This system comprises an image sensor 8, an electronic control unit (ECU) 9 for controlling the operation for reading sensor (pixel) signals in a time series, an A-D converter 10 for converting pixel signals Vo outputted in a time series from the image sensor 8 into corresponding digital signals DS, a memory 11 for storing offset compensation values OFS predetermined for output characteristics of pixels (light sensor circuits) and multipliers MLT for gain compensation, both of which can be selected in accordance with an address signal ADDRESS (X, Y) of a pixel to be processed, and an output compensating circuit 12 for performing arithmetic operations necessary for the offset and gain compensation of the digitized sensor (pixel) signals using corresponding offset compensation values OFS and multipliers MLT read from the memory 11.

As the sensor signals Vo are output in a time series from the image sensor 8 there are adopted an output A of each light sensor circuit with VGa and VDa in the state of shutting off incident light to the image sensor and an output B of each light sensor circuit with VGb and VDb as previously described.

Figure 10:
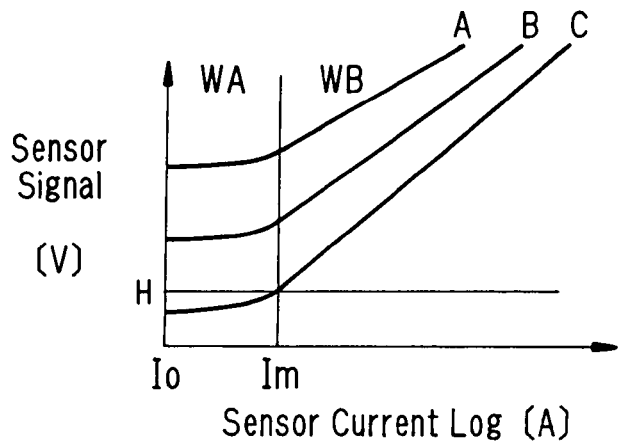
FIG. 10 shows exemplary variations in output characteristics of pixel signals from the image sensor, which variations were derived from the structure of respective light sensor circuits of the image sensor.

In FIG. 10, there is shown an example of structure-derived variations in output characteristics of three sensor (pixel) signals A, B and C. In the shown example, a sensor current value Im corresponding to a threshold H of a pixel output represents a point at which characteristics of pixel signals A, B and C change from a non-logarithmic response region WA to a logarithmic response region WB. Io designates a sensor current in the light sensor circuit in the dark output state (with no incident light thereto).

In FIG. 10, the output characteristics of respective pixel signals to be corrected have the same gradient in the non-logarithmic response region WA but they are different in shape from each other in the logarithmic response region WB. Parameters for each pixel signal are information about the point at which its characteristic changes from the non-logarithmic response region WA to the logarithmic response region WB and pixel outputs appearing in the dark state of the image sensor.

Figure 9:
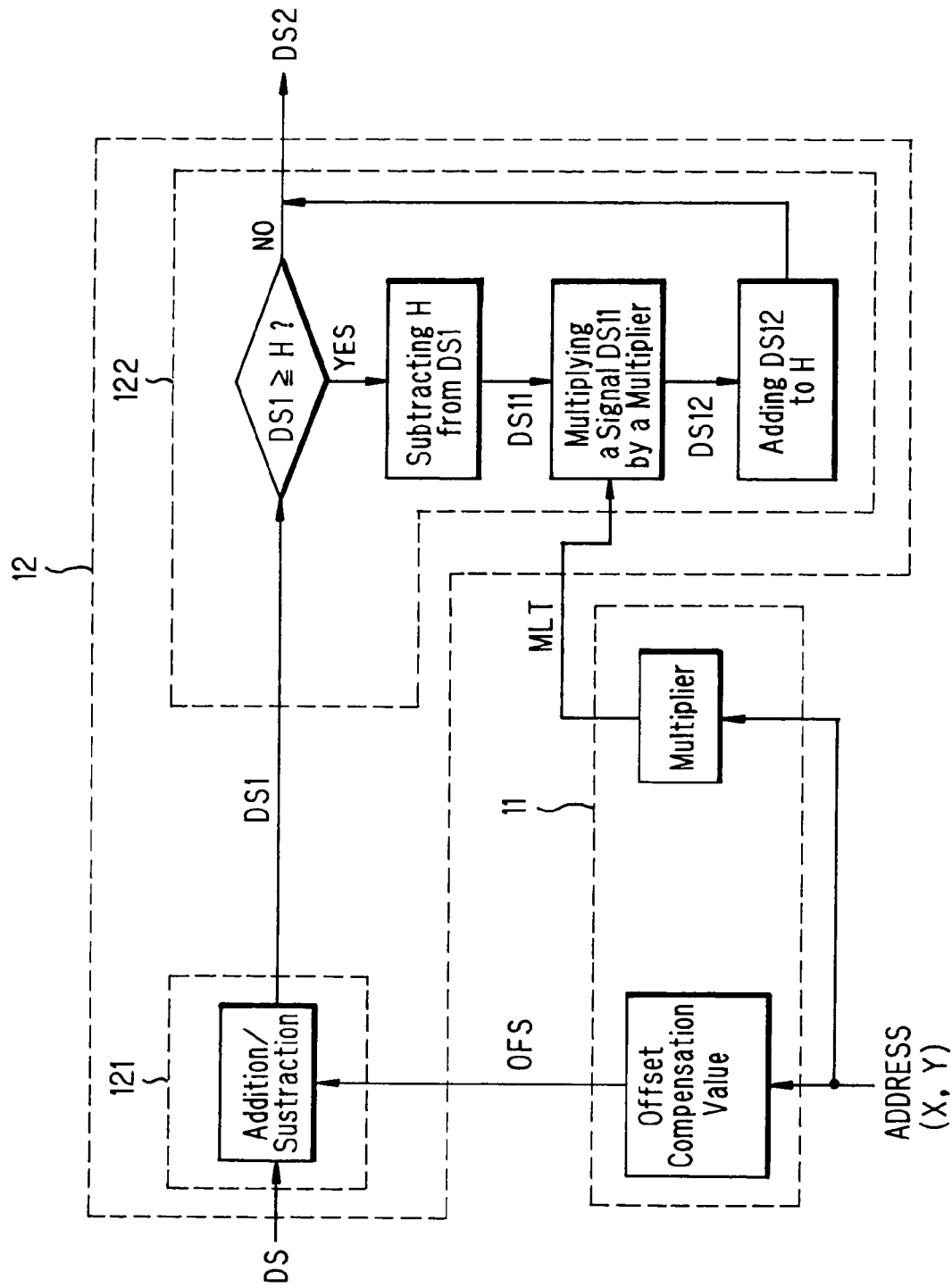
FIG. 9 is a flowchart depicting the operation of the output compensating device of FIG. 8.

FIG. 9 is a flowchart depicting the operation of the output compensating circuit 12.

Figure 11:
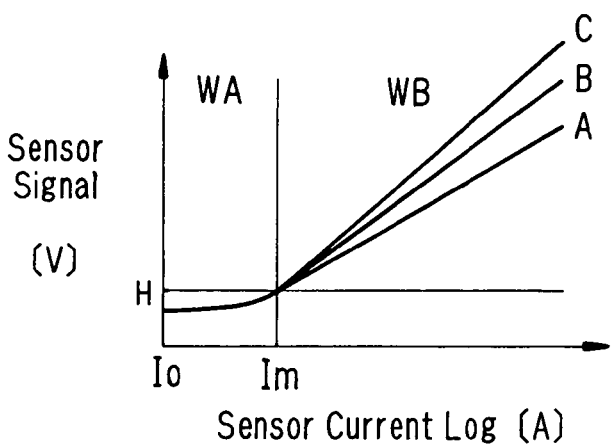
FIG. 11 shows output characteristics of pixel signals, which were obtained by offset compensation of the signals having the output characteristics shown in FIG. 10.

The memory 11 holds a table of offset compensation values OFS for correcting outputs of respective pixel signals so as to attain a value H at a sensor current of Im. In an offset compensating portion 121, the digitized sensor (pixel) signals DS are corrected by arithmetic operations (addition, subtraction) using corresponding offset-compensation values OFS. As the result of the offset compensation, three pixel signals (A, B and C) have the same characteristic in the non-logarithmic response region WA as shown in FIG. 11.

Next, a gain compensating portion 122 performs the gain compensation of output characteristics of three pixel signals in the logarithmic response region WB above the threshold value H by arithmetic operations (multiplication) based on the offset-compensated signals DS1.

In practice, the offset-compensated pixel signal DS1 is checked whether it is greater than the threshold value H and, if so (i.e., the signal is in the logarithmic region WB), it is further subjected to gain compensation by the following arithmetic operations using a specified multiplier MLT selected from the memory 11.

Output←$H$+(Pixel Signal $DS1$−$H$)×Multiplier

A resulting signal is output as an output-compensated sensor (pixel) signal DS2.

Figure 12:
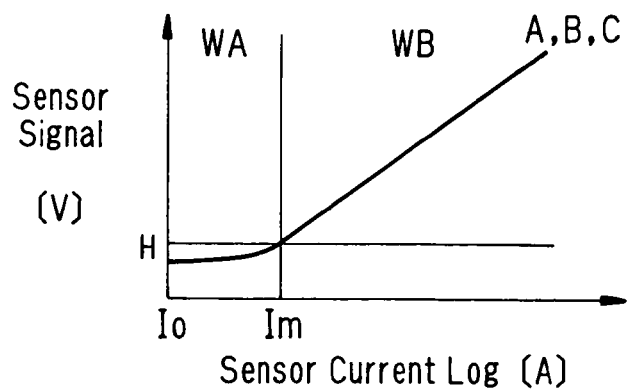
FIG. 12 shows output characteristics of pixel signals, which were obtained by offset and gain compensations of the signals having the output characteristics shown in FIG. 10.

As the result of the above-described gain compensation, three sensor (pixel) signals A, B and C have the same characteristics in the logarithmic response region WB as shown in FIG. 12. In this instance, the offset-compensated pixel signal DS1 being smaller than the threshold value H (i.e., in the non-logarithmic response region WA) is directly output as an output-compensated digital sensor (pixel) signal DS2.

Figure 14:
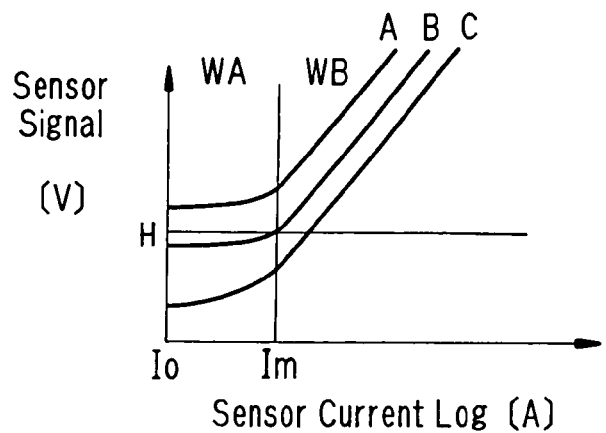
FIG. 14 shows another example of variations in output characteristics of pixel circuits of an image sensor, which are derived from the structural variations of respective light sensor circuits of the image sensor.

FIG. 14 shows another example of structure-derived variations in output characteristics of three sensor (pixel) signals A, B and C. In this instance, the output characteristics of respective pixel signals have the same gradient in the logarithmic response region WB but they are different in shape from each other in the non-logarithmic response region WA.

Figure 13:
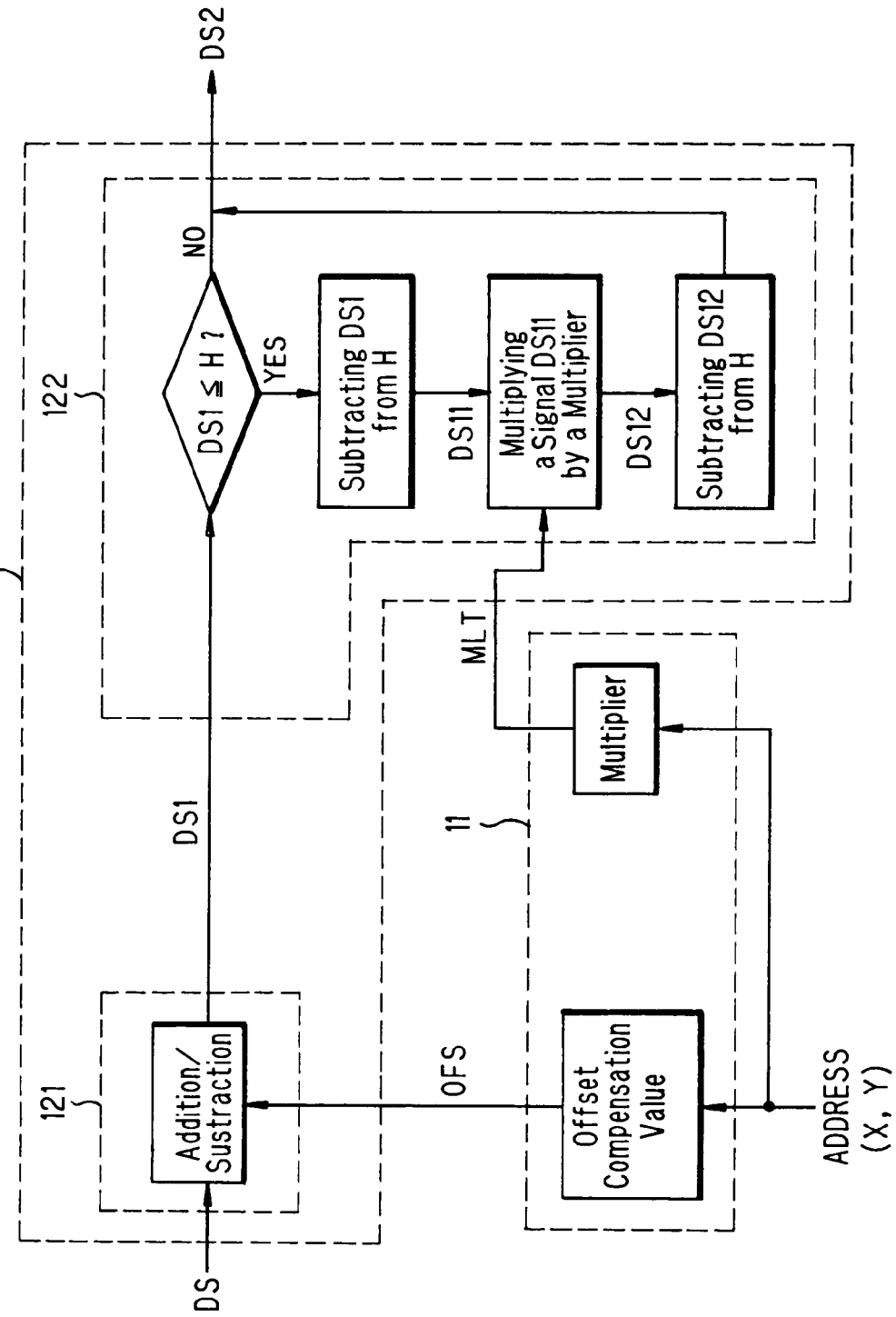
FIG. 13 is a flowchart depicting the operation of an output compensating device of an image sensor according to another embodiment of the present invention.

FIG. 13 is a flowchart depicting the operation of the output compensating circuit 12.

Figure 15:
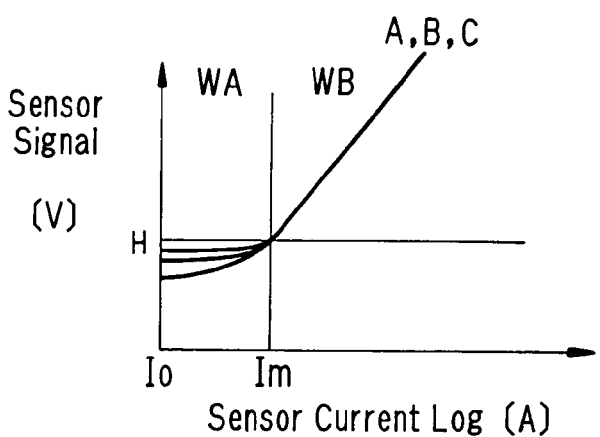
FIG. 15 shows output characteristics of pixel signals, which were obtained by offset compensation of the sensor (pixel) signals having the output characteristics shown in FIG. 14.

The memory 11 holds a table of offset compensation values OFS for correcting outputs of respective pixel signals so as to attain a value H at a sensor current of Im. In an offset compensating portion 121, the digitized sensor (pixel) signals DS are corrected by arithmetic operations (addition, subtraction) using corresponding offset compensation values OFS. As the result of the offset compensation, three pixel signals (A, B and C) have the same characteristic in the logarithmic response region WB as shown in FIG. 15.

Next, in a gain compensating portion 122, the gain compensation of output characteristics of three pixel signals in the non-logarithmic response region WA below the threshold value H is carried out by arithmetic operations (multiplication) based on the offset-compensated signals DS1.

In practice, the offset-compensated sensor (pixel) signal DS1 is checked whether it is smaller than the threshold value H and, if so (i.e., the signal is in the non-logarithmic region WA), it is further subjected to gain compensation by the following arithmetic operations using a specified multiplier MLT selected from the memory 11.

Output←$H$−($H$−Pixel Signal $DS1$)×Multiplier

A resulting signal is output as an output-compensated sensor (pixel) signal DS2.

Figure 16:
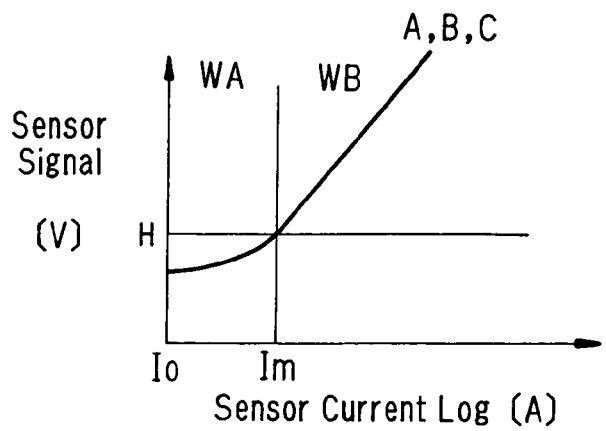
FIG. 16 shows output characteristics of sensor (pixel) signals, which were obtained by offset compensation and gain compensation of the signals having the output characteristics shown in FIG. 14.

As the result of the above-described gain compensation, three pixel signals A, B and C have the same characteristics in the non-logarithmic response region WA as shown in FIG. 16. In this instance, the offset-compensated pixel signal DS1 being greater than the threshold value H (i.e., in the logarithmic response region WB) is directly output as an output-compensated digital sensor (pixel) signal DS2.

Figure 18:
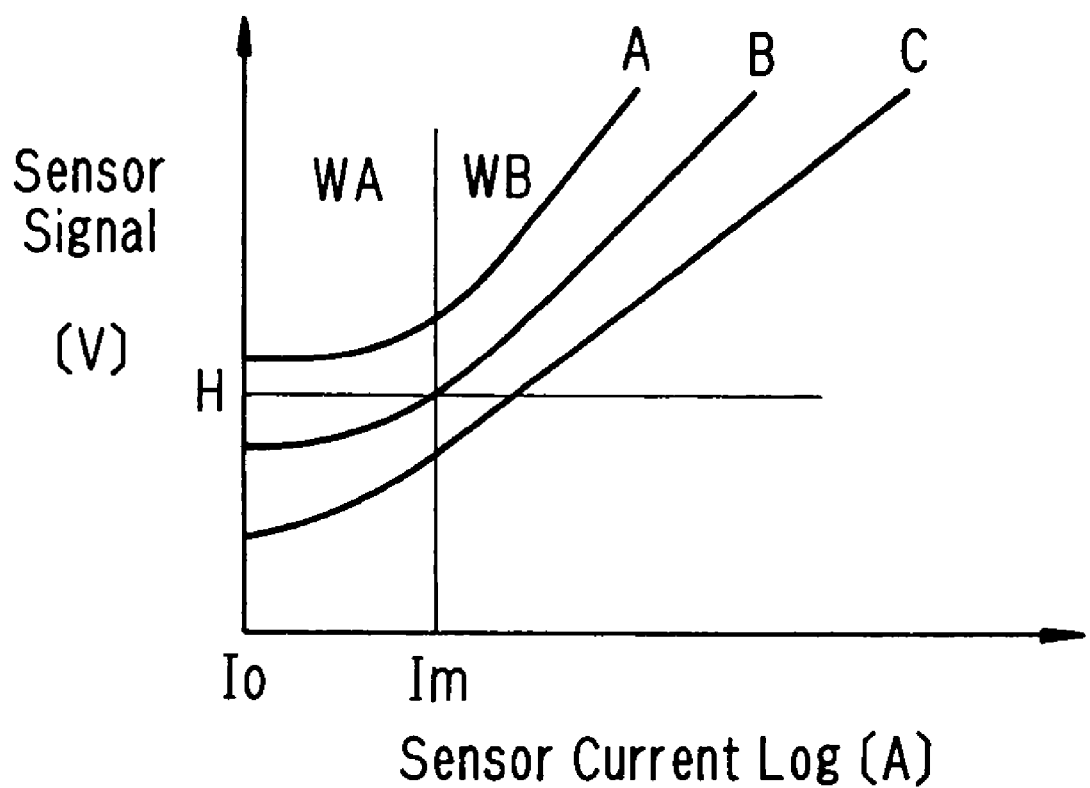
FIG. 18 shows another example of variations in output characteristics of pixel signals of an image sensor, which variations are derived from the structural variations of respective light sensor circuits of the image sensor.

FIG. 18 shows another example of structure-derived variations in output characteristics of three sensor (pixel) signals A, B and C. In this instance, the output characteristics of respective pixel signals have the different gradients in the logarithmic response region WB and they are different in shape from each other in the non-logarithmic response region WA.

Figure 17:
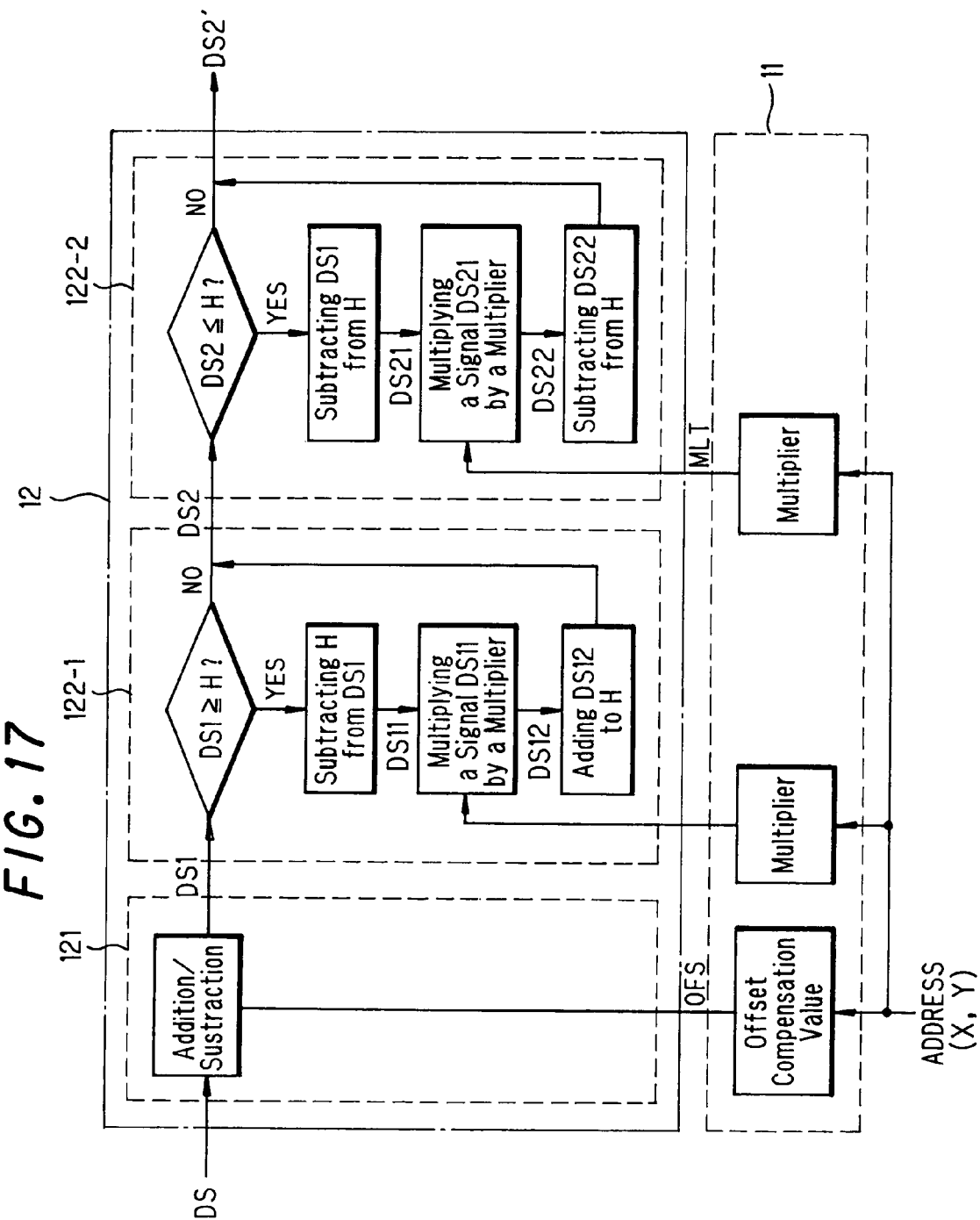
FIG. 17 is a flowchart depicting the operation of the output compensating device of an image sensor according to another embodiment of the present invention.

FIG. 17 is a flowchart depicting the operation of the output compensating circuit 12, wherein the combination of processing operations of FIGS. 9 and 13 is applied for offset- and gain-compensation of respective sensor signals A, B and C. As the result of the offset- and gain-compensation, sensor signals DS2' having the same characteristics in the non-logarithmic region WA and logarithmic response regions WB are finally obtained.

Figure 21:
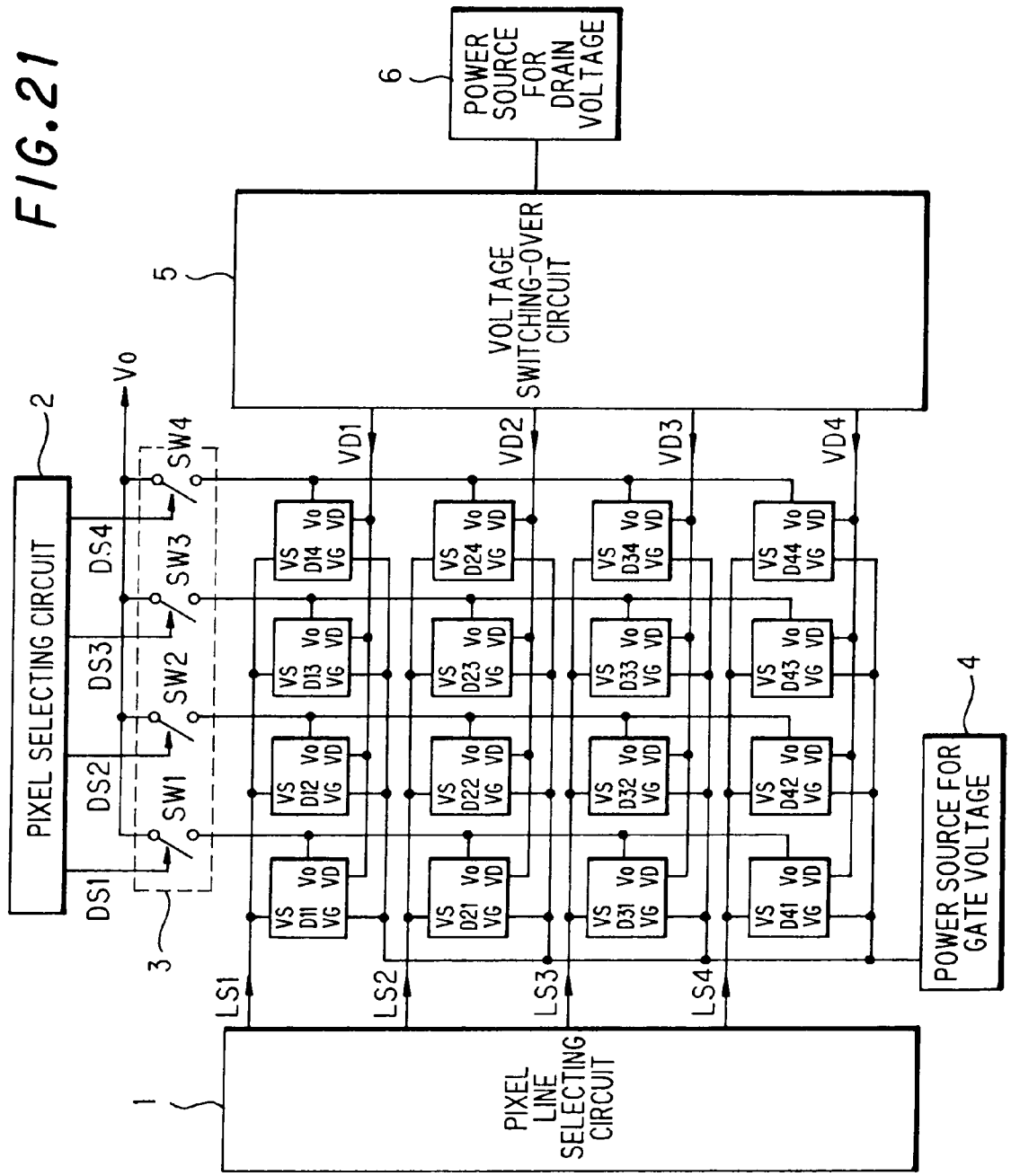
FIG. 21 is a block diagram showing a basic construction of an image sensor according to the present invention.
Figure 22:
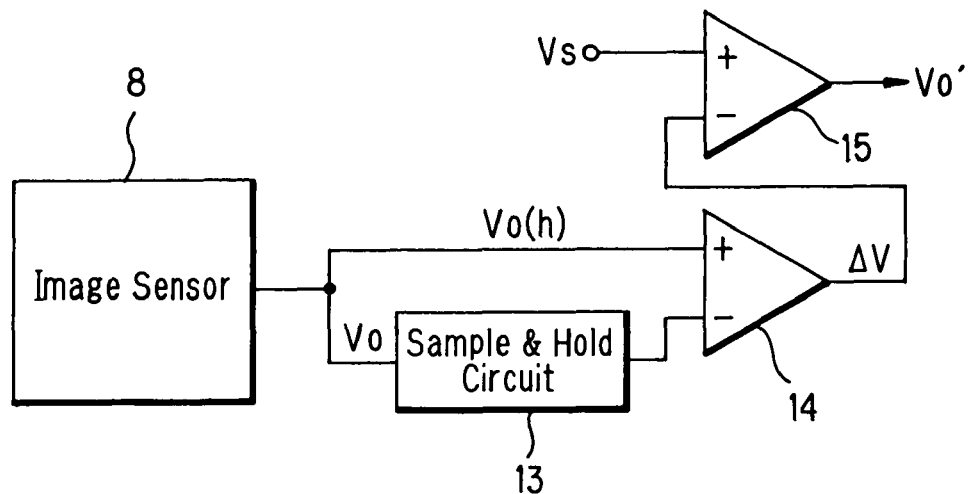
FIG. 22 is a block construction diagram of an image-sensor output-compensating device according to an embodiment of the present invention.

The present invention enables the image sensor of FIG. 21 to perform, at any time if necessary, offset-compensation for variations in output levels of sensor (pixel) signals Vo output in a time series from the image sensor. FIG. 22 shows an exemplary construction of an output compensating device of an image sensor, which can carry out the above compensation.

Specifically, the output compensating device comprises a sample-and-hold circuit 13 for temporarily storing normal sensor signals Vo read in a time series from an image sensor 8, arithmetic circuit 14 for determining a value of $\Delta V$=(Vo (h)−Vo)), i.e., a difference $\Delta V$ between a pseudo bright-output signal Vo(h) obtained by decreasing by a threshold value Vth a normal drain voltage of the transistor Q1 for a corresponding pixel circuit and a sensor signal Vo previously stored by the sample-and-hold circuit 13, and an arithmetic circuit 15 for conducting offset compensation of a reference signal Vs corresponding to a preset bright output by subtracting the determined difference $\Delta V$ (offset value) from the reference signal Vs. The above-described components are operated at specified timings under the control from an electronic control unit ECU (not shown).

Figure 23:
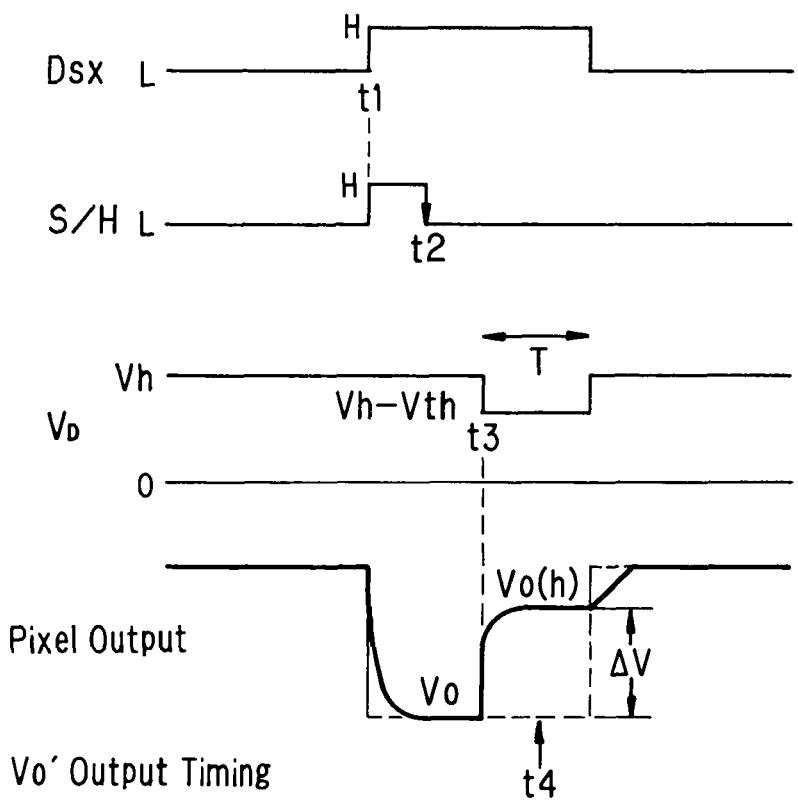
FIG. 23 is a time chart of signals produced at respective portions of the output-compensating device of the image sensor of FIG. 22.

FIG. 23 is a time chart of signals produced at respective portions of the output compensating device of FIG. 22.

When a pixel selecting signal DSx reaches the high level H at timing t1 and a sensor signal Vo from a corresponding pixel is read out, a sample-and-hold signal S/H of a high level H at timing t1 is generated and the sensor signal Vo is held by the sample-and-hold circuit 13 at timing t2 of the sample-and-hold signal falling. At timing t3, the drain voltage VD of the transistor Q1 for the corresponding pixel is changed from the normal value of the high level to a voltage value (Vh-Vth) reduced by a threshold value Tth and is held for a period T. A pseudo bright output signal Vo(h) is now obtained.

The pseudo bright output signal Vo(h) is given to the arithmetic circuit 14 whereby an offset value is determined as a difference ΔV between the pseudo bright output signal Vo(h) and the sensor signal Vo stored in the sample-and-hold circuit 13. The reference signal Vs corresponding to the predetermined bright output is offset-compensated for a offset value ΔV by the arithmetic circuit 15 and an offset-compensated sensor signal Vo' is output at timing t4.

The offset compensation of sensor signals Vo readable in a time series from the image sensor 8 may be conducted always or periodically under the control from the ECU or as necessary according to an instruction input from the outside. In these cases, the offset compensation values must be subsequently stored in a memory for a specified period or until the subsequent instruction is given. The application of the present invention offers the following advantages:

An output compensating device according to an aspect of the present invention, which is used in an image sensor using a number of light sensor circuits each representing a unit pixel and working by producing in a photoelectric converting element a sensor current proportional to incident light falling thereon, converting the sensor current into a voltage signal by a transistor with a logarithmic output characteristic in a weak inverse state using its sub-threshold region characteristic and outputting a sensor signal corresponding to the converted voltage signal and provides therein means for compensating for variations in each pixel output by using corresponding sensor outputs obtainable when changing a gate voltage and drain voltage of the transistor with no incident light to the photoelectric converting element to be lower than normal voltages of the transistor for taking video. This enables the image sensor to easily compensate for variations in output characteristics of respective light sensor (pixel) circuits in a pseudo bright output state created therein with no incident light falling thereon.

An output compensating device according to another aspect of the present invention, which is used in an image sensor using a number of light sensor circuits each representing a unit pixel and working by producing in a photoelectric converting element a sensor current proportional to incident light falling thereon, converting the sensor current into a voltage signal by a transistor having a logarithmic output characteristic in a weak inverse state using its sub-threshold region characteristic and outputting a sensor signal corresponding to the converted voltage signal and provides therein means for compensating for variations in each pixel output by using the first sensor output obtainable by changing the gate voltage and the drain voltage of the transistor with shut-off incident light to the photoelectric converting element to normal values for taking video and the second sensor output obtainable by changing a gate voltage and drain voltage of the transistor with shut-off incident light to the photoelectric converting element to values lower than the normal values for taking video. This enables the image sensor to easily compensate for variations in output characteristics of respective light sensor (pixel) circuits in a pseudo bright output state and a dark output state created therein respectively with no incident light falling on the image sensor.

An output compensating device according to another aspect of the present invention, which is used in an image sensor using a number of light sensor circuits each representing a unit pixel and working by producing in a photoelectric converting element a sensor current proportional to incident light falling thereon, converting the sensor current into a voltage signal by using a sub-threshold region characteristic of a transistor having a logarithmic output characteristic in a weak inverse state and outputting a sensor signal corresponding to the converted voltage signal, and provides therein means for compensating for variations in each pixel output by using a sensor signal obtainable when conducting the transistor by changing its gate voltage to a value higher than a normal value for taking video by the image sensor. This enables the image sensor to easily perform offset-compensation for variations in respective light sensor (pixel) circuits in a pseudo dark state.

An output compensating device according to another aspect of the present invention is used in the same image sensor can achieve more precise compensation for variations in the output of each of the light sensor (pixel) circuits in the dark state in such a manner that a drain voltage of the transistor of the light sensor (pixel) circuit is first set to a value at which an output signal obtained from the sensor circuit when conducting the transistor by changing its gate voltage to a value higher than a normal value may correspond to a dark-state sensor signal obtainable in a dark output state with the normal gate voltage of the transistor when taking video by the image sensor, and the compensation for variations in each pixel output is then conducted by using an output signal obtained by changing the gate voltage of the transistor to a value higher than the normal value. This enables the image sensor to more precisely compensate for variations in outputs of respective pixel circuits in the dark state.

An output compensating device according to another aspect of the present invention is used in the same image sensor to provide therein means for compensating for variations in each pixel output by using a sensor signal obtainable by changing gate and drain voltages of the transistor with shut-off incident light to the photoelectric converting element to values lower than normal values for taking video. This enables the image sensor to create pseudo bright output state therein without using any light source and easily perform gain-compensation for variations in the output of the respective light sensor (pixel) circuits.

An output compensating device according to another aspect of the present invention, which is used in an image sensor using a number of light sensor circuits each representing a unit pixel and working by producing in a photoelectric converting element a sensor current proportional to incident light falling thereon, converting the sensor current into a voltage signal by using a sub-threshold region characteristic of a transistor having a logarithmic output characteristic in a weak inverse state and outputting a sensor signal corresponding to the converted voltage signal, and provides therein means for compensating for variations in level of each pixel output by using a sensor signal obtainable by conducting the transistor with its gate voltage changed to a value higher than a normal voltage for taking video and with its drain voltage being equal to the normal value, which signal may correspond to a sensor signal obtainable with the dark output state, and a sensor signal obtainable by changing the drain voltage of the transistor to a value lower than the normal, which signal corresponds to a sensor signal obtainable in the bright output state. This enables the image sensor to create pseudo dark and bright output states therein and easily compensate for variations in outputs of respective pixels in the created pseudo dark and bright output states.

An output compensating device of the same image sensor according to another aspect of the present invention is capable of performing more precise compensation for variations in outputs of respective light sensor (pixel) circuits by using sensor signals corresponding to signals in dark and bright output states, which signals can be obtained in the following manners: the drain voltage of a transistor of each sensor circuit is first set to a value at which a sensor signal output from the sensor circuit by conducting the transistor with its gate voltage changed to a value higher than a normal value, which signal may correspond to a dark-state sensor signal obtainable at a normal gain voltage of the transistor, and thereafter a sensor signal output from the sensor circuit by conducting the transistor is used as a sensor signal output in the dark state and a sensor signal obtained by changing the drain voltage of the transistor to a value is used as a sensor signal output in the bright output state. This enables the image sensor to more accurately compensate for variations in output levels of respective sensor signals.

An output compensating device according to another aspect of the present invention, which is used in an image sensor using a number of light sensor circuits each representing a unit pixel and working by producing in a photoelectric element a sensor current proportional to incident light falling thereon, converting the sensor current into a voltage signal by using a sub-threshold region characteristic of a MOS type transistor having a logarithmic output characteristic in a weak inverse state and outputting a sensor signal corresponding to the converted voltage signal, and provides therein means for sampling and holding sensor signals read in a time series from respective pixels (light sensor circuits), obtaining pseudo bright output signals by decreasing by a threshold value the normal drain voltages of the respective transistors corresponding to respective pixels, calculating a difference between each of the obtained pseudo signals and the corresponding one of the sensor signals temporarily stored in the sample-and-hold circuit, and conducting the offset compensation of the bright reference signal previously set and stored in the memory by using the difference value determined as the offset value to obtain the correct output level of each of the sensor signals (pixels). This enables the image sensor to always present high-quality video.

What is claimed is:

1. A method of compensating for the outputs of a number of light sensor circuits of an image sensor, each light sensor circuit representing a unit pixel and working by producing in a photoelectric converting element a sensor current proportional to a quantity of light falling thereon and converting the current into a voltage signal by using a sub-threshold region characteristic of a transistor having a logarithmic output characteristic in a weak inverse state and outputting a sensor signal corresponding to the converted voltage signal, comprising the steps of previously setting a drain voltage of the transistor of each light sensor circuit to a value at which a sensor signal obtained by conducting the transistor with its gate voltage changed to a value higher than a normal value may correspond to a sensor signal obtainable in a dark state of the light sensor circuit with the normal gate voltage of the transistor when taking video, and thereafter performing compensation for variations in output of each pixel signal by using a sensor signal obtainable from the light sensor circuit by changing the gate voltage of the transistor with the preset drain voltage to a value higher than the normal value for taking video, wherein offset compensation for variations in dark-state output levels of pixel signals is performed by using sensor signals obtainable by conducting the transistors with the drain voltage of the preset value and the gate voltage changed to a value higher than the normal value for taking video, which signals correspond to sensor signals obtainable in the dark state for taking video, wherein gain-compensation for variations in bright-state output levels of pixel signals is performed by using sensor signals obtainable by changing the gate voltage and the drain voltage of the transistor with shut-off incident light to the photoelectric converting element to values lower than the normal values for taking video, which signals correspond to sensor signals obtainable in a bright state for taking video.

2. A method of compensating for outputs of light sensor circuits of an image sensor as defined in claim 1, wherein ranges of changing the gain voltage and the drain voltage of the transistor to be lower than the normal voltages for taking video are of zero to values determined by subtracting a threshold voltage of the transistor from the normal gain voltage value and drain voltage value respectively.

* * * * *